United States Patent [19]

Edwards et al.

[11] Patent Number: 5,901,315
[45] Date of Patent: May 4, 1999

[54] METHOD FOR DEBUGGING A JAVA APPLICATION HAVING NATIVE METHOD DYNAMIC LOAD LIBRARIES

[75] Inventors: Jonathan W. Edwards; David H. Evans; Michael G. Vassil, all of Lexington, Ky.

[73] Assignee: International Business Machines Corporation, Armonk, N.Y.

[21] Appl. No.: 08/874,644

[22] Filed: Jun. 13, 1997

[51] Int. Cl.$^6$ ............................... G06F 9/44; G06F 11/00
[52] U.S. Cl. .................... 395/704; 395/701; 395/183.14; 395/183.01; 395/406; 395/500; 395/527; 395/682
[58] Field of Search ..................................... 395/704, 701, 395/183.14, 183.13, 183.1, 183.01, 185.01, 682, 500, 650, 406, 527

[56] References Cited

U.S. PATENT DOCUMENTS

| | | | |
|---|---|---|---|
| 5,067,072 | 11/1991 | Talati et al. | 395/708 |
| 5,548,717 | 8/1996 | Wooldridge et al. | 395/704 |
| 5,630,049 | 5/1997 | Cardonza et al. | 395/183.01 |
| 5,652,869 | 7/1997 | Herdeg et al. | 395/500 |
| 5,764,989 | 6/1998 | Gustafsson et al. | 395/704 |
| 5,787,245 | 7/1998 | You et al. | 395/183.14 |

OTHER PUBLICATIONS

Wesley et al., "The Java Virtual Machine Specification," (Chap. 1 Introduction) pp. 1–3 (1977).

OS/1 Warp V3 Control Program Programming Ref, 2.26 DosDebug, IBM Corp. 1994, (1996).

Win DeBug, "About Debugging Support," mk:@ivt:pdwbase/live/pdwbase/debug_7H84.htm (Nov. 1998).

ptrace, AIX Version 4.3 Base Operating System and Extensions Technical Reference, vol. 1, pp. 1–13 (1997).

package sun.tools.debug, http://www.cdt.luth.se/java/doc/sun/shared/Package-sun.tools.debug.html (Nov. 1998).

Bothner (Dig. of Papers, COMPCON, Spring 1997, pp. 174–178).

Horstmann (SIGS Pubs, pp. 63–70, Mar. 1996).

*Primary Examiner*—Tariq R. Hafiz
*Assistant Examiner*—Tuan Q. Dam
*Attorney, Agent, or Firm*—Jeffrey S. LaBaw; David H. Judson

[57] ABSTRACT

A method for debugging a target application comprising Java code having native method dll's associated therewith. The method is carried out in a computer having an operating system, a system debug application programming interface (API), and a Java virtual machine having a Java debug API. According to the method, the Java virtual machine is first launched under the system debug API. The application is then run under the Java virtual machine. Because the Java virtual machine that runs the target application itself runs under the system debug API, simultaneous control of the target application via the system debug API and the Java debug API is enabled. Thus, the method effects the debug of the target application by simultaneously debugging the Java code and the native method dynamic load libraries.

27 Claims, 4 Drawing Sheets

METHOD FOR DEBUGGING A JAVA APPLICATION HAVING NATIVE METHOD DYNAMIC LOAD LIBRARIES

BACKGROUND OF THE INVENTION

1. Technical Field

The present invention relates generally to computer software development tools and more particularly to a method for debugging a Java application that includes native method dynamic load libraries (e.g., C or C++ code).

2. Description of the Related Art

Java, originally developed by Sun Microsystems, is a known software programming environment in which software programs, known as Java applications, are developed, tested and maintained. Java applications have found extensive use on the World Wide Web, which is the Internet's multimedia information retrieval system. Java developers often "extend" a Java application by linking the Java code with native method dynamic load libraries (or "dll's"). A "native method" dll is usually a function written in "C" or "C++" programming language and that is not portable across different operating platforms without recompilation. When the Java application includes linked native method dll's, a problem arises in debugging the application.

In particular, while "tools" for debugging Java code, on the one hand, and tools for debugging C/C++ code, on the other hand, are well-known, there are no available techniques for simultaneously debugging a piece of software that includes both types of code. As a result, the prior art has addressed the problem of debugging Java applications having linked native method dll's by a brute force approach—typically, by using distinct debug routines that are run separately. This approach requires the Java application (with the linked dll's) to be executed twice (one for each debug routine), thus substantially increasing the time necessary to debug the Java application. Another approach is to use distinct debugging routines, one for Java and one for the C or C++ code, and then switch back and forth between the two routines as needed. While such an approach is theoretically possible, the prior art has not found a way to implement such a technique in a reliable, efficient manner.

The present invention addresses this problem.

SUMMARY OF THE INVENTION

It is a primary object of this invention to debug a "target" application that has been written in Java and extended using native-method dynamic load library functions.

It is another object of this invention to simultaneously debug a Java application having C/C++ application code associated therewith.

It is yet another object of this invention to enhance the functionality of existing Java application debug tools.

Another object of this invention is debug a Java application having native-method dynamic load libraries with a single debugging routine and without having to switch back and forth between independent debug methods.

Yet another object of this invention is to enhance the development of new software applications written under the Java programming environment.

It is another object of this invention is remotely debug a Java application having C/C++ dynamic load libraries associated therewith.

These and other objects of the present invention are provided in a method for debugging a target application comprising Java code having native method dll's associated therewith. The method is carried out in a computer having an operating system, a system debug application programming interface (API), and a Java virtual machine having a Java debug API. According to the method, the Java virtual machine is first launched under the system debug API. The application is then run under the Java virtual machine. Because the Java virtual machine that runs the target application itself runs under the system debug API, simultaneous control of the target application via the system debug API and the Java debug API is enabled. Thus, the method effects the debug of the target application by simultaneously debugging the Java code and the native method dynamic load libraries. Events generated during the debug process are characterized as being initiated from the Java code or the native method dll's, as the case may be.

In a preferred implementation, the debugger comprises a GUI front end, a debug engine back end, and a "probe" or daemon. The GUI provides an interface through which the user makes requests and views the status of the application being debugged. The debug engine performs the debugging work by controlling the probe to manipulate the target application (through the JVM) and to report events to the debug engine. The probe is preferably implemented as two distinct processes, a first "daemon" process that performs native method debugging, and a second "probe" process that performs the Java method debugging. The first process also preferably controls the second process across the system debug API and communicates therewith via a socket connection to facilitate the simultaneous debugging of the Java and C/C++ code comprising the target application.

According to another feature of the invention, the front and back end components of the debugger are supported on a first computer while the first and second "processes" are supported on a second computer. The first and second computers are then connected over a computer network (e.g., via a TCP/IP connection) to facilitate remote debugging of the target application.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
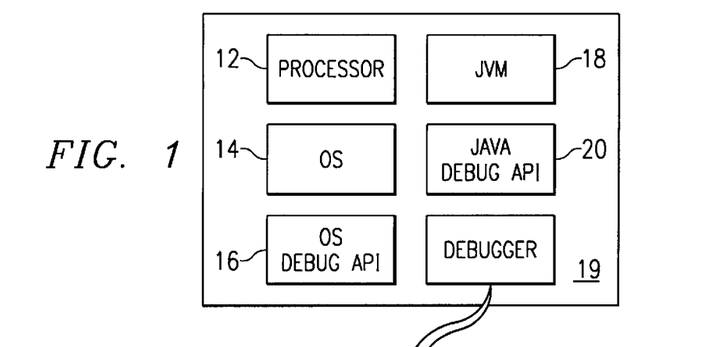
FIG. 1 is a block diagram of a representative computer in which the present invention is implemented in whole or in part.

As will be described below, one or more of the processes that comprise the "debugger" of the present invention may be carried out on a computer, or on one or more computers connected via a computer network. Referring to FIG. 1, a computer for use in implementing the present invention is shown. The computer 10 has a processor 12, an operating system 14, an operating system debug application programming interface (API) 16 and a Java virtual machine (JVM) intepreter 18. The JVM is an abstract computing machine that includes an instruction set and uses various memory areas. Sun Microsystems Java Development Kit (JDK) Version 1.0.2 emulates the JVM on various platforms. A JVM has an associated Java debug API 20 to enable an application developer to debug Java code. Further details about the JVM may be obtained in *The Java™ Virtual Machine Specification,* Tim Lindholm and Frank Yellin, Addison Wesley (1997), ISBN 0-201-63452-X, which is incorporated herein by reference.

Thus, for example, the computer used in the present invention is any personal computer or workstation platform that is Intel-, PowerPC®- or RISC®-based, and that includes an operating system such as IBM® OS/2®, Microsoft Windows '95, Microsoft Windows NT 4.0, Unix, AIX® or the like. A representative computer runs an Intel x86 processor, the OS/2 Warp Version 3 operating system, the DosDebug system API and JVM Version 1.1.1 having the sun.tools.debug API. Alternatively, the computer runs an x86 processor, the Windows '95 (or Windows NT) operating system, WinDebug and JVM Version 1.1.1. Yet another alternative is to run a computer having an x86 processor, the AIX operating system, PTrace debug system API and JVM 1.1.1. For illustrative purposes, the remainder of this description describes the invention in the context of the OS/2 operating system and the DosDebug system API, with the understanding that the appropriate OS and system debug API functionality for other corresponding operating systems may be substituted. Any suitable Java virtual machine interpreter (having an associated Java debug API) may also be used. In any event, it is assumed that the computer includes a system debug API and a JVM having a Java debug API.

As referenced above, the various processes that comprise the present invention may reside on the same host machine or on different machines interconnected over a network (e.g., the Internet, an intranet, a wide area network (WAN) or local area network (LAN)). Thus, a machine running the present invention has appropriate networking hardware to establish a connection out to another computer. For example, the machine may have a TCP/IP or NETBIOS connection to a network running over a token ring or Ethernet adapter.

Figure 2:
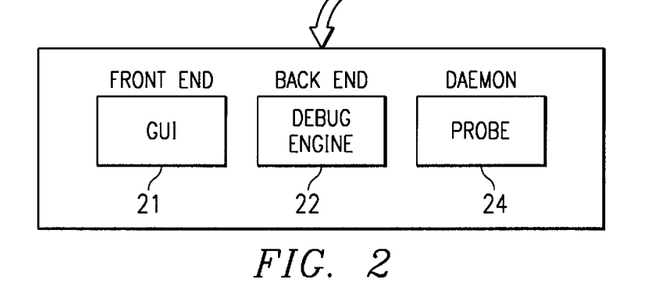
FIG. 2 is a block diagram of the main components of the debugger of the present invention.

FIG. 2 is a block diagram of the main components of the debugger 19 of the present invention. This mechanism is preferably implemented in software and is used to debug a "target" application that is written in Java but that optionally comprises one or more native method dynamic load libraries or "dll's." Typically, a dll is written in "C" or "C++" programming language, and thus it will be appreciated that the present invention provides a mechanism for simultaneously debugging Java and C/C++ code.

The debugger 19 includes a graphical user interface (GUI) or "front end" 21, a debug engine or "back end" 22, and a probe 24. The GUI of the front end (FE) provides a user-friendly interface through which the user makes debug requests and views the status of the "target" application being debugged. The GUI may be implemented through the existing Windows-based display interface of the computer on which the debugger runs. Generally, the debug engine (DE) 22 constituting the back end (BE) performs all of the debugging work. As will be seen in more detail below, the probe 24 is used by the debug engine (DE) to abstract communications (since the target application being debugged may run on the same or a different machine), to manipulate the target application, and to report so-called debug "events" to the DE. As is well-known, representative debug "events" comprise breakpoint events, single step events, a load events (which may include dll events) and/or fault events. The function of a debugger is to identify such event(s) in the target application (i.e. the application being debugged) and report those events back to the user.

Figure 3:
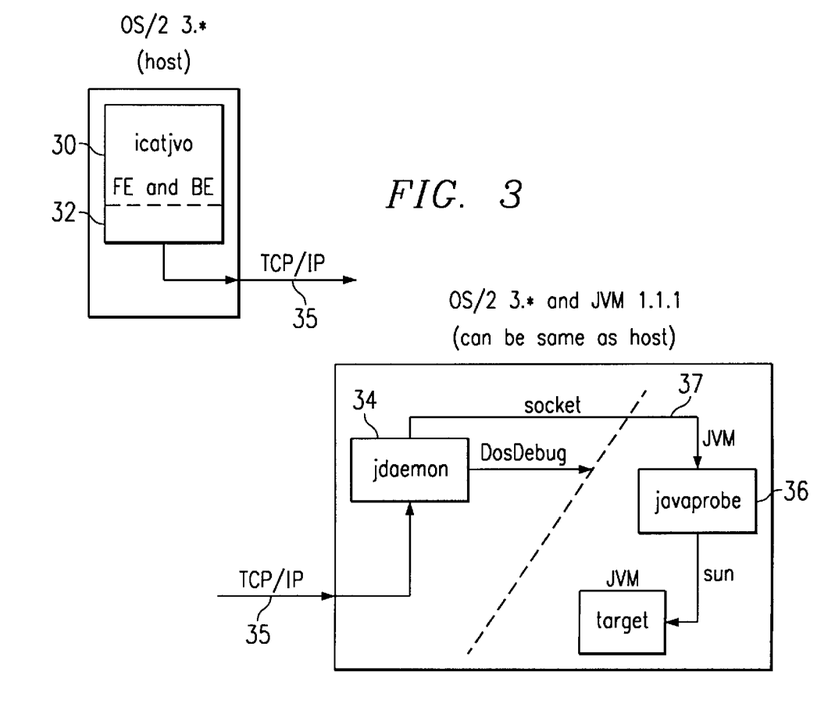
FIG. 3 is a detailed block diagram of the various processes of the debugger of the present invention.

A more detailed block diagram of the debugger is provided in FIG. 3. In the illustrative embodiment, the debugger is shown as including a number of independent processes that, as noted above, may or may not reside on the same host computer As seen in this preferred embodiment, the debugger for OS/2 Java includes a process referred to "icatjvo" 30 (which corresponds to both the front end (FE) and back end (BE) shown in FIG. 2), a probe library 32, a process called "jdaemon" 34, and a process called "javaprobe" 36. The "jdaemon" and "javaprobe" processes together comprise probe 24 of FIG. 2. The jdaemon process 34 preferably communicates with icatjvo 30 (through the probe library 32) using TCP/IP, and thus icatjvo 30, on the one hand, and jdaemon/javaprobe (34/36), on the other hand, may reside on different machines. In a particular example, the GUI, DE and probe library for icatjvo run on an OS/2 3.* or 4.0 host machine, which may or may not have Java installed. If the target application to be debugged is to run on the host machine (i.e. a so-called "single-machine" solution), then the host must have Java installed. Although not required, the GUI, DE and probe library are preferably written in C and C++ and use OS/2's Presentation Manager (PM) interfaces through VACPP's (VisualAge C++ compiler from IBM) ICLUI (Interactive Class Library User Interface from IBM).

One of the features of the present invention is the ability to debug native methods (C/C++ 16- or 32-bit code in a .dll) from the target Java application. Thus, according to the present invention, a target application may comprise both Java code and native method dll's. To meet this goal, the probe 24 (of FIG. 2) preferably is a mixture of both C and Java code. The component that consists of the "C" code is the jdaemon process 34 of FIG. 3, and the component that consists of the Java code is the javaprobe process 36. As will be seen, the jdaemon process 34 uses the system debug API (DosDebug, in the case of OS/2, 3) to control and manipulate the "C" or "C++" portions of the application under debug. Likewise, the javaprobe process 36 uses the Java debug API (sun.tools.debug API, in the case of JVM 1.1.1) to control and manipulate the Java portions of the application under debug. Preferably, there is only one copy of the probe (comprising both jdaemon and javaprobe) running on a system servicing requests from one or more copies of the icatjvo process.

According to the present invention, the debugger "probe" comprises two distinct components: jdaemon and javaprobe. Jdaemon preferably comprises C code, and this process communicates with the debug process (icatjvo) using TCP/IP (although this is not required). The jdaemon process preferably "controls" javaprobe, and it also communicates with javaprobe (using TCP/IP) for the purposes to be described below. In operation, jdaemon uses the DosStartSession utility of the operating system (or an equivalent utility if some other operating system is used) to launch javaprobe. It then uses the system debug API (in this case, DosDebug) to manipulate the javaprobe process as well as the target application's JVM. On the contrary, the javaprobe process preferably comprises Java code. The javaprobe process may use the RemoteDebugger Java class (part of the JVM) to start the target application. It then uses the Java debug API (in this case sun.tools.debug API) to manipulate the target application.

Thus, in the preferred embodiment of FIG. 3, the icatjvo process 30 communicates with the jdaemon process 34 running on the same machine as the JVM that runs the Java application under debug. This enables remote debugging over the TCP/IP connection 35 if desired. The jdaemon process uses the DosStartSession utility of the operating system and DosDebug (the system debug API) to launch the javaprobe class under a JVM. This can be seen in FIG. 3, where all of the components to the right of the dotted line should be considered to be under DosDebug control. The javaprobe class in turn uses the Java RemoteDebugger class to launch the target application (the "debuggee") under the sun.tools.debug API. Both JVMs are preferably under the control of DosDebug from jdaemon. The jdaemon process also communicates with the javaprobe using a socket connection 37, and the javaprobe process manipulates the target application under debug using sockets and the sun.tools.debug API. Thus, in a representative operation, the jdaemon process 34 creates a socket and waits for a copy of the icatjvo process 30 to connect to the socket. When that occurs, jdaemon spins off a new thread to handle the debug session and goes back to waiting for another connection.

Thus, one of ordinary skill will appreciate that the jdaemon process 34 manipulates the C/C++ threads of the target application's JVM to allow icatjvo 30 to step into C/C++ methods. When the target application loads a dll, that dll runs in the same process as the target application's JVM.

According to important feature of the present invention, the jdaemon process launches the JVM under the system debug API. By using DosDebug to control a JVM and an addressing scheme to distinguish between Java and "C" (or C++) native events, one can debug a Java application and its native methods with the same debugger at the same time. This technique provides significant advantages over the prior art in that it enables the debugger to simultaneously debug Java code and C/C++ native method dll's. Thus, the objects of the present invention are achieved by executing the target JVM under a system's debug application programming interface and then using a probe to simultaneously control the target application via both the system debug API (for C/C++ code) and the Java debug API (for the Java code).

As illustrated in FIG. 3, there are essentially three independent "agents" in the "probe" design: (1) the probe library 32 (which is linked into the DE and can issue a request at any time) (2) threads in the target application that are running C/C++ code (which can generate a DosDebug notification at any time), and (3) threads in the target application that are running Java code (which can invoke one of the daemon's Java DebuggerCallback methods at any time). In the preferred embodiment, the thread that handles the debug session starts the pieces of the probe and spawns additional threads so that there is typically (at least) one thread per independent agent. The main thread then waits for one of the agents to take some action. Once a request or notification is received (and forwarded to the main thread by the appropriate handler thread, if necessary), the main thread invokes the proper handlers and coordinates the activity of the agents.

Because the JVM that runs the Java application under debug itself runs under DosDebug (in the preferred embodiment), the JVM is "frozen" whenever a DosDebug event occurs. In order to interact with the JVM (e.g., to issue sun.tools.debug API requests), the daemon must still allow the JVM to run, but it also must try to ensure that any application threads (those running C/C++ code or the Java application) do not make progress (and change their state). To this end, the probe keeps track of the modules that are loaded and the threads that are created when the JVM starts (before the application has been started). The threads and modules are termed "special." Special threads are typically those that are not part of the target application.

Whenever the probe quiesces the target application, it allows the special threads, and any thread whose program counter (e.g., the "EIP register" for Intel x86 platforms) indicates it is executing in one of these special modules, to run (and freezes all other threads). The probe then uses the sun.tools.debug RemoteThread.suspend() call to suspend any Java application threads. It then issues debug commands (whether DosDebug or sun.tools.debug API) on behalf of the debugger.

Figure 4:
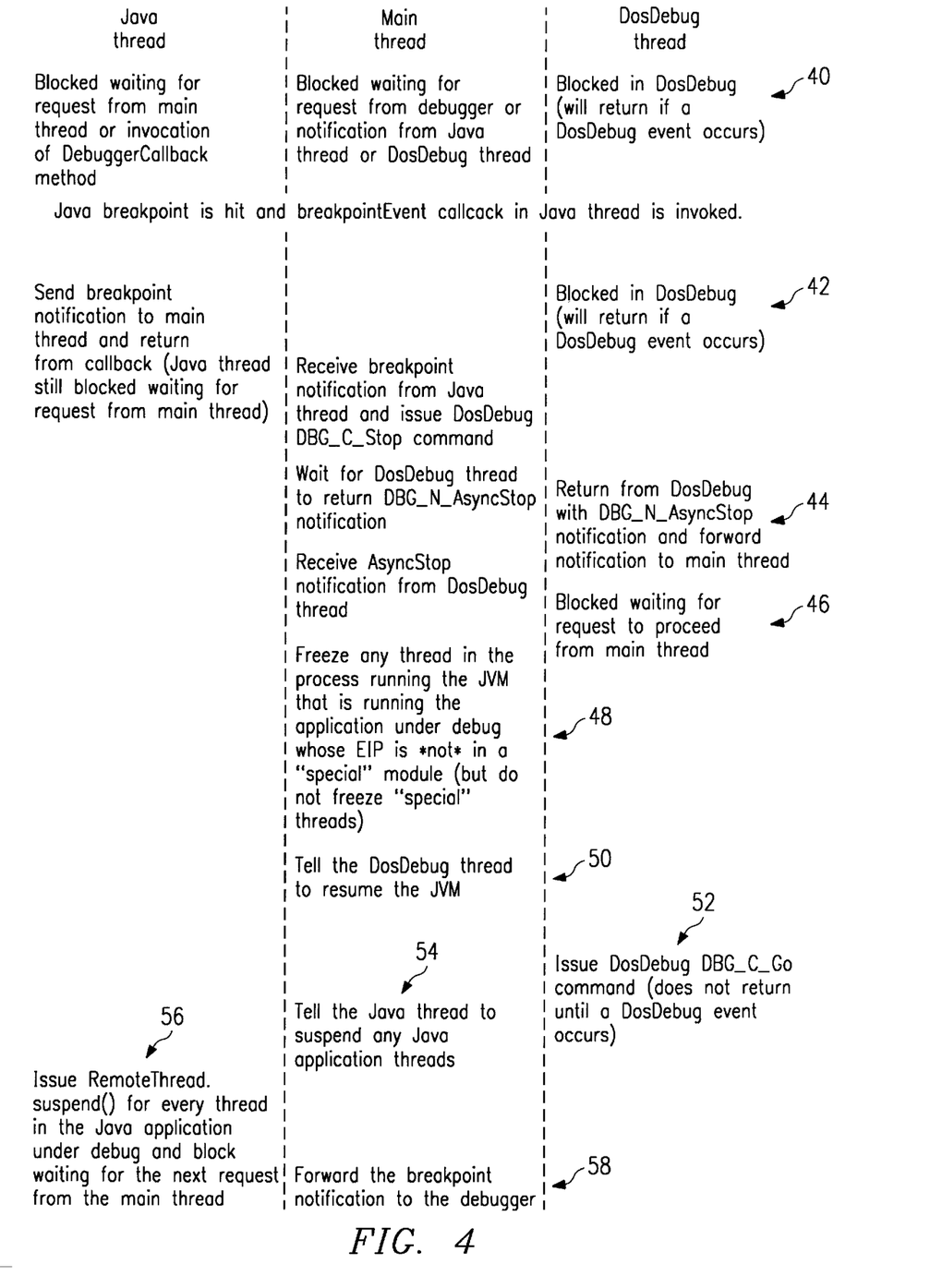
FIG. 4 is a state diagram illustrating the interaction of the various processes of the debugger during a representative debug operation.

FIG. 4 is a state diagram illustrating the operation of the debugger. In this example, assume the user has set a Java breakpoint and resumed the system. The state diagram shows the flow of control and the interaction between threads when the breakpoint is hit. The leftmost column represents the Java thread belonging to the javaprobe process. The middle column of the diagram represents the main thread, which is the jdaemon process, and the rightmost column represents the DosDebug thread. In state 40, the Java thread is blocked waiting for a request from the main thread or invocation of the DebuggerCallback( ) method. The main thread is blocked waiting for the request from icatjvo 30 or notification from javaprobe or the DosDebug thread. At this point, it is assumed that the Java breakpoint is hit. This causes the breakpointEvent callback in the Java thread to be invoked. As will be seen, any Java threads in the application will not be run until the callback returns.

At state 42, the javaprobe sends a breakpoint notification to jdaemon and returns from the callback. The Java thread is still blocked waiting for the request from the main thread. The main thread, jdaemon, receives the breakpoint notification from javaprobe and issues a DosDebug DBG_C_Stop command. The routine then continues at state 44 with the main thread waiting for the DosDebug thread to return a DBG_N_AsyncStop notification. When the DosDebug thread forwards the DBG_N_AsyncStop notification to the main thread, as indicated at state 46, the DosDebug thread blocks a "waiting for" request to proceed from the main thread. At this point, state 48, the main thread freezes any thread in the process running the JVM that is running the target application whose EIP is not is a "special" module. The main thread, however, does not freeze "special" threads. During state 50, the main thread tells the DosDebug thread to resume the JVM. The routine then continues at state 52 with the DosDebug thread issuing a DosDebug DBG_C_Go command (which does not return until a DosDebug event occurs). At state 54, the main thread instructs the Java thread to suspend any Java application threads.

Thereafter, during state 56, the Java thread issues a RemoteThread suspend( ) call for every thread in the Java application under debug and blocks a "waiting for" the next request from the main thread. The main thread then continues with state 58 to forward the breakpoint notification to the icatjvo process. This completes the processing. At this point, the debugger can interact with the main thread to inspect or modify the application's state. If the main thread needs to make a DosDebug call to perform the requested operation, it does so. (If the JVM running the application is not stopped, the main thread first issues a DosDebug DBG_C_Stop command and waits for the DosDebug thread to notify the main thread that the JVM is stopped).

If the main thread needs to interact with the Java thread (i.e. to make a sun.tools.debug API call) to perform the requested operation, the main thread sends the request to the Java thread and waits for the reply. Some "long running" operations, such as resume and step, are performed asynchronously and the main thread keeps state so that it will not try to send a request to the Java thread if a prior request is outstanding. If the JVM running the application is stopped, the main thread tells the DosDebug thread to resume the JVM before the main thread sends its request to the Java thread.

The jdaemon and javaprobe processes "know" whether a particular debug event originates in the native method or Java code, as the case may be. Thus, for example, javaprobe gets notified of Java events and jdaemon gets notified of debug API events. From the debug engine's perspective, the particular source of a given event is readily identifiable. To enhance this abstraction of the simultaneous debug of Java and native method code, however, the present invention implements an addressing scheme that allows for the determination and presentation of the event type (either Java or native method event) without the debug engine specifically inquiring about it. Thus, for example, a given "event" is returned over the TCP/IP connection to the debug engine in a format known to the engine. The engine then manipulates and presents the information irrespective of whether it was C or Java event.

This addressing scheme promotes reuse of the GUI and DE code and presents a more seamless transition between Java and C/C++. In operation, information derived during the debug routine is processed to determine whether a particular "event" originated in the Java portion of the code or in the C/C++ portion of the code. To this end, the invention "encodes" information about locations in the Java code, stack depth, and the like, as 32-bit addresses. If a high-order bit of an address is set, the DE and jdaemon interpret the remainder of the address in a "java context". The next nine bits of the address determine whether the address refers to Java code (bits all set), to a static item (bits all clear), or to a variable on the stack (bits encode the index of the stack frame of interest). The remaining 22 bits uniquely identify the desired object (e.g., contain code PC or a handle for a remote variable).

Thus, this encoding scheme enables the jdaemon process to know (in a transparent manner) whether the debug engine is asking about Java or native method code events.

According to the invention, the debug engine interacts with the jdaemon process throughout the debug session. When the DE needs to evaluate an expression, for example, the context of the expression determines which language-specific evaluator to use. The DE communicates through a common interface to each expression evaluator (EE). This common interface defines requests the DE can make (validate an expression, evaluate an expression, update a value, etc.) and services requests the EE can make of the DE (storage, registers, stack, debug information, etc.). In order to perform a given expression service request, the DE may in turn communicate with the daemon via the probe library.

For C/C++ expressions, the EE preferably runs on the host machine and is written in C++. For Java expressions, it is advantageous to write the Java EE in Java (64-bit arithmetic, etc.). Additionally, the host machine may not have Java installed. Hence, the Java EE preferably run on the target (which may be the same as the host) machine. In order for the DE to treat each EE as a black box, there is a stub Java EE on the host machine which bundles any DE request into a character string and makes a service request to pass the string to the daemon via the probe library. The daemon then forwards this string to the actual Java EE where it is decoded into a particular request. Any return information is then bundled into a character string and sent back to the stub EE running on the host machine. In order to handle a particular request, the Java EE may need to communicate with the JVM via the RemoteDebugger class and its associated objects (stack, variable information, etc.).

The DE communicates with an expression evaluator (EE) through a common interface. This interface consists of requests the DE can issue (validate an expression, evaluate an expression, etc.) and service requests an EE can make (read/write memory, read/write registers, get debug information, etc.).

For the sub Java EE, each request is converted to a null-terminated character string. The stub evaluator then makes a service request to pass this string to the actual Java EE (via the probe library and daemon). The actual Java EE then decodes the string into a particular request, handles the request, and encodes any reply information into a null-terminated character string where it is then sent back to the stub evaluator. The stub evaluator then decodes the reply string and returns the information back to the DE, thus completing the DE request.

Figure 5A:
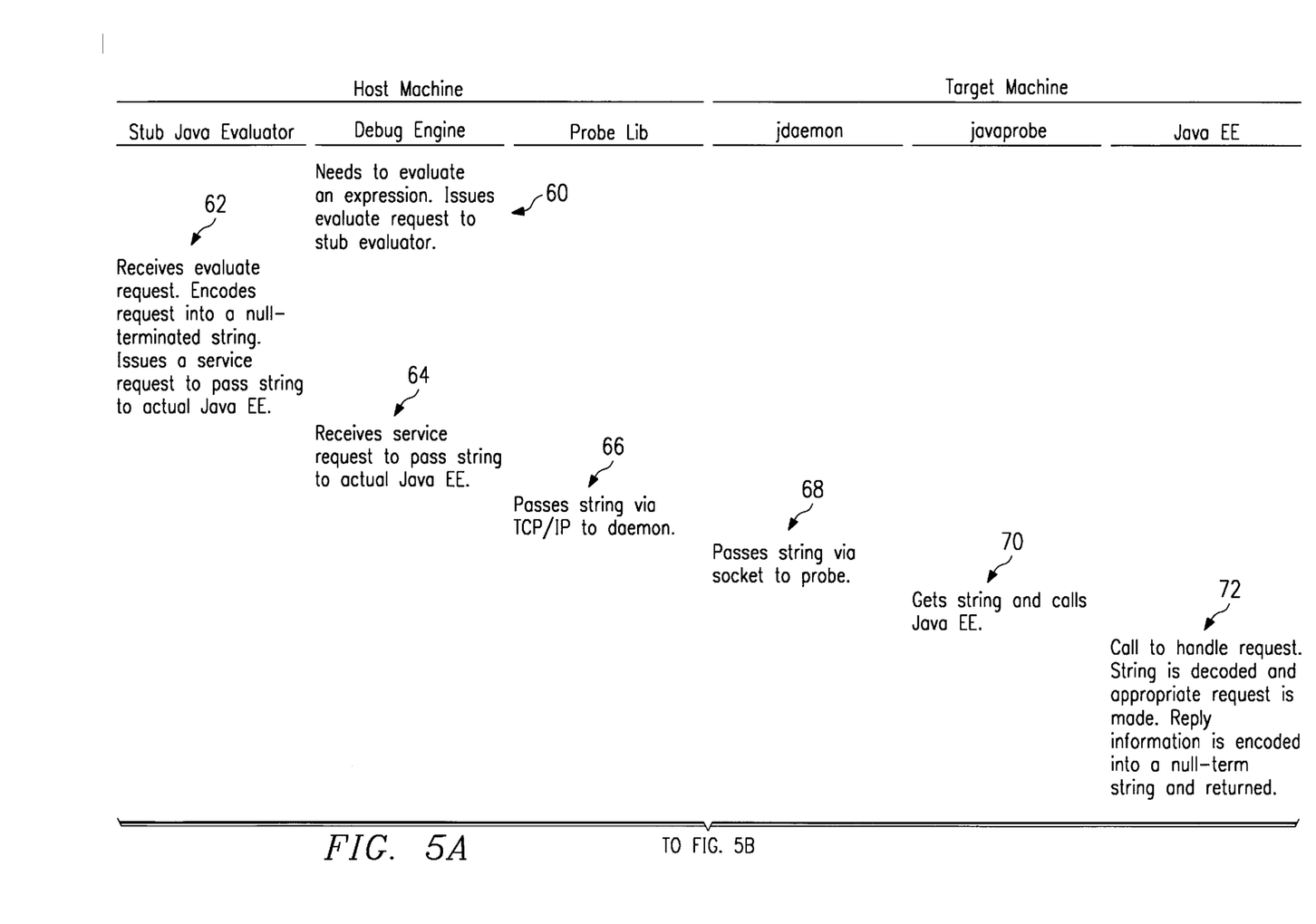
FIGS. 5A–5B are a composite state diagram illustrating the operation of the expression evaluator (EE) interface of the present invention.
Figure 5B:
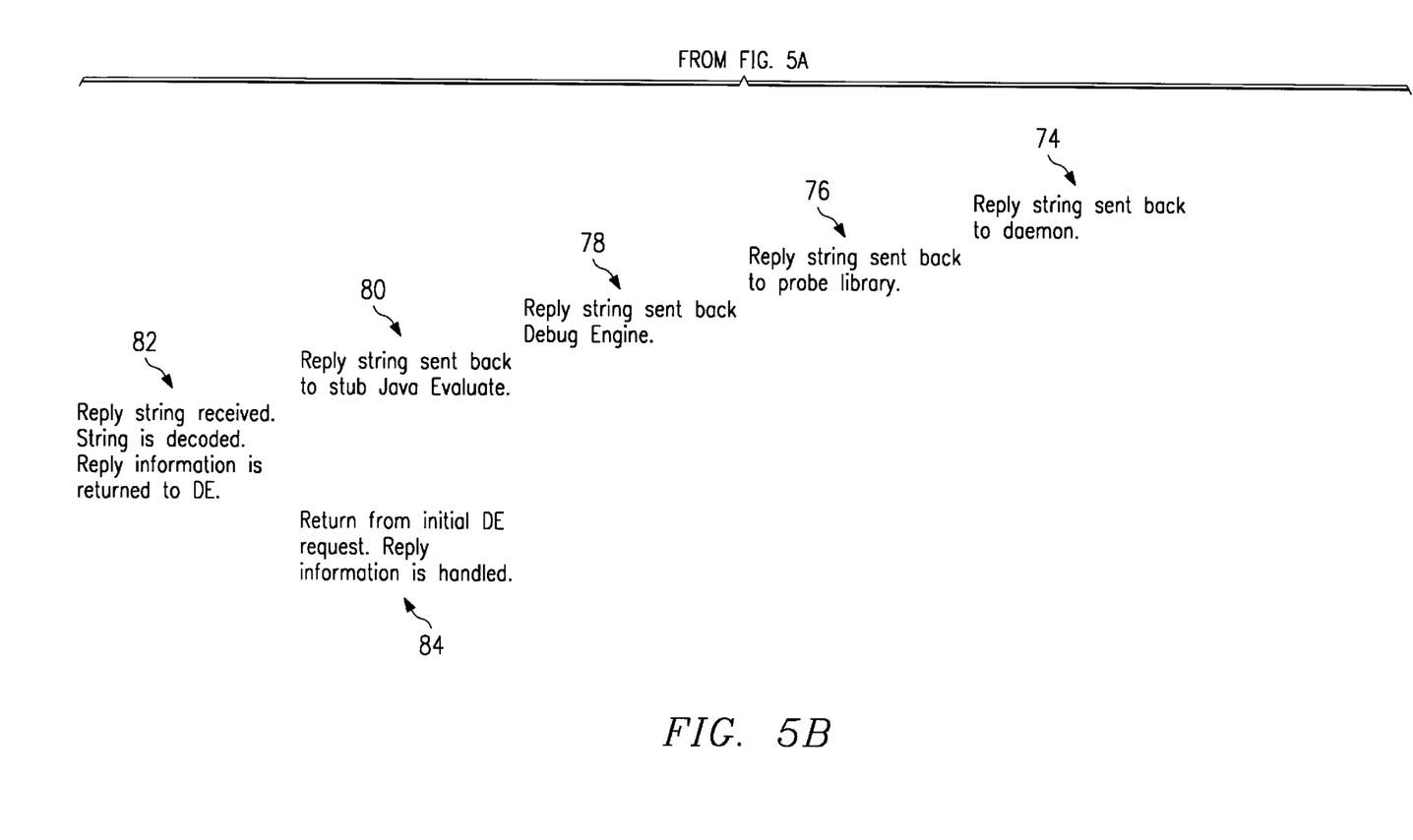

This operation is illustrated in the state diagram of FIG. 5A–5B. The three columns on the left side of the diagram reflect the stub evaluator, the DE and the probe library, respectively, and the three columns on the right side are jdaemon, javaprobe and Java EE, respectively. The routine starts at step 60 wherein the DE needs to evaluate an expression. As a result, the DE issues an evaluate request to the stub evaluator. This request is received at state 62, wherein the stub evaluator encodes the requests into a null-terminated string and issues a service request to pass the string to the actual Java EE. At state 64, the DE receives the service request to pass the string to the actual Java EE. The probe library then passes the string via TCP/IP to the daemon at state 66. At state 68, jdaemon passes the received string to javaprobe via a socket. The routine then continues at state 70 with javaprobe getting the string and calling Java EE. At state 72, Java EE is called to handle the request. At this time, the string is decoded and the appropriate request is made. The reply information is encoded into a null-terminated string and returned to javaprobe.

At state 74, javaprobe sends the reply string back to jdaemn, which then return the reply string back to the probe library at state 76. The routine then continues at state 78 with the probe library sending the reply string back to DE. The DE then continues at state 80 and sends the reply string back to the stub evaluator, which then decodes the string and returns the decoded information back to the DE during state 82. At state 84, the Debug Engine returns from the initial DE request and the reply information is handled. This completes the processing.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The present invention provides significant advantages over the prior art. By using the operating system debug API (e.g., DosDebug) to control a JVM and by using an addressing scheme to distinguish between Java and "C" (or C++) native events, one may debug a Java application and its native methods with the same debugger at the same time. DosDebug is used for OS/2, but one of ordinary skill will appreciate that the concept is extensible to Windows NT or Windows '95 (via WinDebug) and Unix systems (via PTrace), as well as other platforms (such as Apple Macintosh).

The present invention is also extensible beyond debugging a Java application having C/C++ native methods. In particular, the inventive concepts may be practiced to debug any target application written in a first, platform-independent programming environment (e.g., the SmallTalk programming environment/language) and having platform-dependent native method dynamic load libraries associated therewith. In such case, the daemon and probe "processes" that comprise the probe will not be "tailored" to the particular code requirements and an appropriate programming environment interpreter (in lieu of the JVM) must be used. The inventive concept of executing the interpreter under the system debug API and then running the target application under the interpreter while being probed remains applicable (for any interpreter that exports a debug API (distinct from the system debug API) and that uses native method code).

It should be appreciated by those skilled in the art that the specific embodiments disclosed above may be readily utilized as a basis for modifying or designing other techniques for carrying out the same purposes of the present invention. It should also be realized by those skilled in the art that such equivalent constructions do not depart from the spirit and scope of the invention as set forth in the appended claims.

What is claimed is:

1. A method of debugging an application comprising Java code and native method dynamic load libraries, the method operating in a computer having an operating system, a system debug application programming interface (API), and a Java virtual machine having a Java debug API, comprising the steps of:

launching the Java virtual machine under the system debug API;

executing the application under the Java virtual machine; and as the application is executing under the Java virtual machine, simultaneously debugging the Java code and the native method dynamic load libraries.

2. The method as described in claim 1 wherein the Java code is debugged using the Java debug API and the native method dynamic load libraries are debugged using the system debug API.

3. The method as described in claim 2 wherein the step of simultaneously debugging the Java code and the native method dynamic load libraries includes:

suspending the Java virtual machine upon occurrence of a native method dynamic load library event; freezing any thread running native method code; and resuming execution of the Java virtual machine with the native method code threads frozen.

4. The method as described in claim 1 wherein the step of simultaneously debugging the Java code and the native method dynamic load libraries includes:

upon occurrence of a Java event, freezing any thread running native method code.

5. The method of debugging as described in claim 1 further including the step for distinguishing whether a given event is associated with the Java code or native method dynamic load library code.

6. The method of debugging as described in claim 5 further including the step for reporting whether the given event is associated with the Java code or native method dynamic load library code.

7. The method of debugging as described in claim 1 wherein the native method dynamic load library code is written in a programming language selected from the group of programming languages consisting of "C" and "C++".

8. The method as described in claim 1 wherein the operating system is OS/2 and the system debug API is DosDebug.

9. A method for debugging a target application comprising Java code and C/C++ code, comprising the steps of:

launching a Java virtual machine under an operating system debug application programming interface (API) running on a target machine;

executing the target application under the Java virtual machine; and as the application is executing under the Java virtual machine, simultaneously controlling the target application via the system debug API and a Java debug API.

10. The method as described in claim 9 wherein the Java code is debugged under the control of the Java debug API and the C/C++ code is debugged under the control of the system debug API.

11. The method as described in claim 9 wherein the Java virtual machine is launched from a first computer and the target application is executed under the Java virtual machine in a second computer.

12. The method as described in claim 11 wherein the second computer runs the OS/2 operating system, the system debug API is DosDebug and the Java debug API is sun.tools.debug API.

13. A computer program product in a computer-readable medium for debugging an application comprising Java code and native method dynamic load libraries, the product including components independently executable in at least one computer having an operating system, a system debug application programming interface (API), and a Java virtual machine having a Java debug API, the computer program product comprising:

a debug process for launching the Java virtual machine under the system debug API;

means operative under the debug process for simultaneously debugging the Java code and native method dynamic load library code.

14. The computer program product as described in claim 13 wherein the debugging means comprises a daemon process and a java probe process.

15. The computer program product as described in claim 14 wherein the daemon process debugs the native method dynamic load libraries under the system debug API and the java probe process debugs the Java code under the Java debug API.

16. The computer program product as described in claim 13 wherein the debug process further includes a graphical user interface (GUI) for receiving debug request and for presenting information to a user regarding a status of the application being debugged.

17. The computer program product as described in claim 13 wherein the debug process is executable on a first computer and the debugging means is executable on a second computer.

18. In a computer network, a method of debugging an application comprising Java code and native method dynamic load libraries, the computer network having a first computer and a second computer, the second computer including an operating system debug application programming interface (API), a Java virtual machine (JVM) interpreter and an associated Java debug API, the method comprising the steps of:

initiating a debug session from the first computer by launching, at the second computer, the JVM under the system debug API; and at the second computer, simultaneously debugging the Java code and the native method dynamic load libraries.

19. The method as described in claim 18 further including the step of:

returning to the first computer results of the debugging.

20. The method as described in claim 19 further including the step of displaying the results on the first computer.

21. The method as described in claim 18 wherein the first and second computers are connected via TCP/IP.

22. A computer, comprising:

a processor;

an operating system having a system debug application programming interface (API);

a Java interpreter having an associated Java debug API;

a debugger for simultaneously debugging a target application comprising Java code and native method dynamic load libraries, comprising:

a debug process for launching the Java interpreter under the system debug API; and means operative under the debug process for simultaneously debugging the Java code and native method dynamic load library code.

23. The computer as described in claim 22 wherein the debugging means comprises a daemon process and a Java probe process.

24. The computer as described in claim 23 wherein the daemon process debugs the native method dynamic load libraries under the system debug API and the java probe process debugs the Java code under the Java debug API.

25. The computer as described in claim 22 wherein the debug process further includes a graphical user interface (GUI) process for receiving debug request and for presenting information to a user regarding a status of the target application being debugged.

26. A method of debugging an application comprising interpreted code and native methods, the debugging method operating in a computer having an operating system, a system debug application programming interface (API), and an interpreter that exports its own debug API and that uses native methods, comprising the steps of:

launching the interpreter under the system debug API;

executing the application under the interpreter; and as the application is executing under the interpreter, simultaneously debugging the interpreted code and the native methods.

27. The method as described in claim 1 wherein the interpreted code is debugged using the debug API exported by the interpreter and the native methods are debugged using the system debug API.

* * * * *